United States Patent Office 3,200,012
Patented Aug. 10, 1965

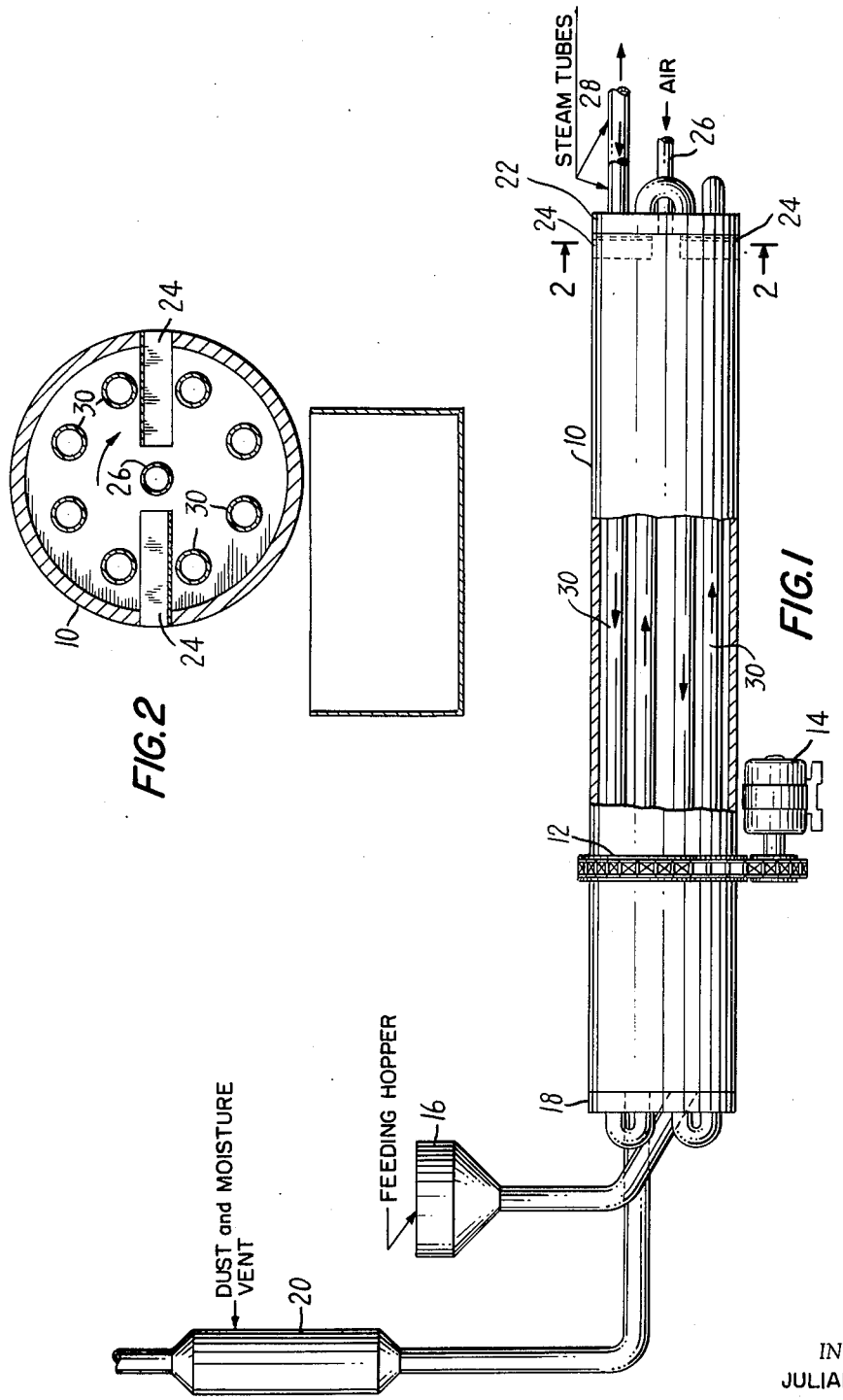

3,200,012
CONTINUOUS PROCESS FOR DEXTRINIZATION
OF PARTICULATE STARCH
Julian A. Hay, Gary, Ind., assignor to American Maize-Products Company, a corporation of Maine
Filed Feb. 8, 1962, Ser. No. 171,969
7 Claims. (Cl. 127—38)

This invention relates to a method of dextrinizing dry particulate starch which makes possible the continuous production of starch dextrines having exceptional solution stablity and low reducing sugar contents.

Starch dextrines are well known commercial products which result from the acid hydrolysis or catalyic modification of starch. The conventional methods of manufacture involve the use of a vertical or horizontal kettle or "cooker," as it is commonly known, equipped with an agitator. These "cookers" are jacketed for the circulation of steam at high pressure or hot oil. Starch is charged into the "cooker" and heated to elevated temperatures in the presence of a catalyst, usually a strong acid, until the desired degree of hydrolysis has occurred, and then dropped and cooled. This method constitutes a batch type operation. One disadvantage of this method is the fact that the acid catalyst, over the relatively long heating period involved, is often volatized before the hydrolysis has been completed, with the result that the hydrolyzed fragments of the linear starch chains do not repolymerize sufficiently to form branched chains as is necessary for dextrine products which will form stable solutions. Another drawback is the presence of water for a prolonged period of time which causes the formation of high amounts of reducing sugars in the final product which is frequently objectionable.

In accordance with the invention, a method has now been discovered which permits the continuous dextrinization of dry particulate starch in such rapid manner that the acid catalyst remains in contact with the starch through most of the time of hydrolysis, whereby a materially greater than usual portion of the linear starch chain fragments are recombined into branched chains to form dextrines having high solution stability. In addition, since the dextrinization takes place substantially in the absence of water, the reducing sugar content of the dextrine products is held to a minimum. The method, being operable on a continuous basis, is well suited for large scale commercial production.

Briefly described, the novel method of the invention involves the steps of mixing catalyst with a mass of starch which is in particulate form, introducing the catalyzed starch into a zone of dextrinization, causing the catalyzed starch particles to tumble into contact with heated surfaces within the zone of dextrinization thereby raising the temperature of the starch to reaction temperature for dextrinization, continuously moving the catalyzed starch through the zone of dextrinization and collecting the dextrinized starch as it discharges from the zone of dextrinization. A preferred additional step is to cause a stream of air to pass through the starch, in countercurrent flow to direction of travel of the starch through the zone of dextrinization, in order to remove moisture, dust and any gases which may be evolved during reaction from the zone of dextrinization.

One of the most important steps of the above described method is that of causing the starch particles to tumble into contact with heated surfaces within the zone of dextrinization. This tumbling movement, which takes place continuously within the zone of dextrinization and by which the starch particles roll and move over each other, maintains direct contact between a maximum proportion of the total surface area of the starch particles and the heated surfaces positioned in the dextrinization zone. As a result, a large amount of heat is quickly and uniformly absorbed by the starch particles and the temperature of the particles is rapidly raised to reaction temperatures. Furthermore, the volatilization of moisture or reaction gases from the starch particles is likewise greatly accelerated by the intimate contact caused by the tumbling movement between the particles and heated surfaces. All of these benefits and advantages are of great significance in rendering the above described method a practicable, commercial process by which particulate starch may be dextrinized over relatively short time intervals of about one hour or less.

One preferred apparatus for carrying out the method of the invention is a horizontally positioned rotatable drum into one end of which dry particulate starch is continuously introduced with acid catalyst. The drum is provided with means for heating interior surfaces thereof. In a preferred embodiment the heating means comprise a plurality of tubes which are positioned within the drum in spaced relationship around the interior wall. Steam is introduced into these tubes and, as the drum rotates, the dry starch is tumbled into direct contact with the tubes. This heats the starch to reaction temperature for hydrolysis and dextrinization which will be completed according to the desired degree by the time the starch reaches the opposite end of the drum where it is discharged. A flow of air through the drum, countercurrent to the direction of travel of the starch, removes moisture and dust as well as any gases which may be evolved during reaction.

The new method may be employed with any type of starch such as those derived from corn, corn amylopectin, wheat, sago, potato, arrowroot and tapioca. In addition, various modified starches may be employed such as oxidized, phosphated and gelatinized starches. These starches are available commercially and usually have inherent water contents of up to 12% by weight. However, these small amounts of water are not sufficient to change the particulate form of the starch and, as long as the starch is not in the form of a paste or slurry, it may be employed as commercially available in the novel method of the invention. Furthermore, no pretreatment of the starch is necessary to eliminate small inherent moisture contents since water vapor may be rapidly removed from within the rotating drum by the countercurrent flow of air.

The starch is catalyzed in conventional manner with a dextrinization catalyst prior to its introduction into the drum. The catalyst may be sprayed or otherwise mixed into the starch in conventional manner. Hydrochloric acid is preferred but other acids such as, acetic, nitric, sulfuric and phosphoric may also be employed. Also, other chemicals such as sodium bicarbonate, aluminum chloride, ammonium carbonate and chlorine gas may be employed in known manner. As used in the specification and claims herein, the term catalyst is intended to refer to any of these and other conventional materials which are known to be catalytically effective for the dextrinization of starch.

In general, the amount of catalyst will vary depending on the type dextrine being manufactured. British gums may be made without any catalyst whereas the highly dextrinized products may have up to 0.03% catalyst based on the weight of the starch. The temperature required for dextrinization is known and will vary according to the particular type of starch that is being treated. By varying the amount and type of catalyst as well as the starch flow rate and the amount of applied heat, starch dextrines of different characteristics can be produced.

For a further understanding of details of the invention, reference will be made to the accompanying drawings of which:

FIG. 1 is a side elevation of one form of apparatus for dextrinizing dry starch in accordance with the invention with portions thereof being in section.

FIG. 2 is a transverse sectional view taken along line 2—2 of FIG. 1.

As shown in FIG. 1, a cylindrical drum 10 is connected for rotation through the chain drive 12 to motor 14. A hopper 16 leads into one end 18 of the drum 10. From the same end 16 extends a vent line 20 through which dust and vapors may exit from within the drum 10. Positioned adjacent the opposite end 22 of the drum 10 is a discharge chute 24. Leading into the end 22 is a pipe 26 through which air may be injected into the drum 10. Also leading into end 22 is a steam line 28 which is connected to the tubes 30 which are positioned parallel to the longitudinal axis of the drum 10 and concentrically around the interior wall thereof. (FIG. 2.)

The operation and function of the apparatus is as follows. High pressure steam is fed into tubes 30 through the line 28 and preferably dry air is injected into the interior of drum 10, and out through vent line 20 as drum 10 is rotated. Powdered starch having the usual acid catalyst mixed therein is then introduced into the end 18 of drum 10 from the feed hopper 16. The starch is continuously tumbled into contact with the hot tubes 30 as it travels through the drum 10 toward the opposite end 22. This rapidly raises the temperature of the starch to that of hydrolysis and dextrinization. Any inherent moisture of the starch is volatized and carried away by the dry air moving in countercurrent flow through the starch from line 26 and out through vent line 20. This air stream also removes fine dust and any gases which may be evolved during the reaction. Since starch is continuously being injected into the drum 10 from hopper 16, the starch is forced to gradually move towards the opposite end 22 of the drum 10 until it is discharged through chute 24. The total time of travel through the drum 10 is relatively short, usually not more than one hour, and the starch is uniformly converted to dextrines by the time it reaches the chute 24. At substantially all times in the drum 10, the starch remains in the presence of the acid catalyst and moisture is substantially completely removed from the starch. Thus, the final product is in many cases ready for end use immediately after discharge and screening to remove grits and charred particles which may have formed without the conventional steps of purification, evaporation and crystallization of a fluid suspension of product. An additional step of neutralization with alkali may be necessary where the small amount of acid catalyst in the final product is considered objectionable.

If desired, the tubes 30 may be eliminated and a steam jacket around the entire wall of the drum 10 employed in place thereof. However, the tubes 30 act as agitators which materially aid the release of moisture from the starch and as much moisture should be removed as possible to form products lowest in reducing sugar content. Accordingly, the tubes 30 are preferred where lower reducing sugar contents are desired. While the rotating drum now described is preferred, other forms of apparatus such as oscillating conveyors and tables may be of utility for tumbling the starch particles into contact with heated surfaces within the zone of dextrinization.

The following examples will illustrate the products which were obtained using the apparatus shown in the drawings.

*Example 1*

Commercial powdered corn starch was catalyzed with 2 ml. of 10° Baumé hydrochloric acid for each pound of starch. This starch, which remained in particulate form after addition of the catalyst, was fed into a drum of the type shown in the drawings which was rotating at approximately 6 r.p.m. and into which steam and dry air was flowing through their respective inlets. The rate of feed was about ½ pound of starch per minute and after 45 minutes a dextrine typical of a highly converted yellow dextrine of conventional manufacture began to discharge from the drum.

A second batch of starch, catalyzed in the same manner, was dextrinized in a kettle by conventional batch operation. The two products were compared as to stability by noting the Brookfield viscosity of a 62% aqueous solution of each over a number of days. The results were as follows:

| Viscosity, cps. | Continuous Drum | Batch Kettle |
|---|---|---|
| Immediate | 5,000 | 5,700 |
| 24 hours | 5,000 | 6,100 |
| 17 days | 6,800 | 18,400 |
| 31 days | 7,700 | 36,600 |

As is evident, the initial viscosity of the aqueous solution of dextrine prepared by the method of the present invention was lower than that of the conventionally prepared batch and remained far lower over the 31 day period. The solution of continuously produced dextrine also remained free-flowing over the entire 31 days whereas beginning on the 17th day and thereafter, the conventional batch solution would flow only after physical agitation. The reducing sugar content of the continuously produced dextrine was 2.5% while that of the batch preparation was 4.9%.

*Example 2*

This run was similar to that of Example 1 except that the catalyzed starch was fed into the drum at the rate of 1 pound per minute. After 23 minutes a dextrine typical of a highly converted yellow dextrine began to discharge. The product had excellent solution stability and a low reducing sugar content.

*Example 3*

This run was similar to that of Example 2 except that the catalyst level was reduced to 1 ml. of 10° Baumé hydrochloric acid per pound of starch. After about 20 minutes, a dextrine typical of a highly converted off white dextrine began to discharge. However, the product had a substantially lower reducing sugar content and excellent solution stability, in these respects being superior to similar conventionally manufactured products.

*Example 4*

The procedure of Example 1 is repeated using powdered amioca starch. The results are approximately the same as those achieved with corn starch.

*Example 5*

The procedure of Example 2 is repeated using powdered tapioca starch and the results are comparable to those obtained with the corn starch.

It will be understood that it is intended to cover all changes and modifications of the preferred embodiments of the invention herein chosen for the purpose of illustration which do not constitute departures from the spirit and scope of the invention.

What is claimed is:

1. A method of continuously dextrinizing starch which comprises the steps of mixing a dextrinization catalyst with starch which is in dry particulate form, introducing the catalyzed starch particles into one end of a zone of dextrinization which is disposed lengthwise in substantially horizontal position, said dextrinization zone having a plurality of heated surfaces therein spaced apart from each other and extending from said one end to the opposite end of said zone along lines substantially parallel to the length thereof, continuously moving the catalyzed starch particles through said dextrinization zone toward said opposite end thereof and simultaneously rotating said heating surfaces in cylindrical paths sweeping through and around the direction of travel of catalyzed starch particles, thereby causing a rolling and tumbling contact of the starch particles with said heated surfaces and rapidly raising the temperature of the starch particles to dextrinization temperatures and collecting the dextrinized starch as it discharges from said opposite end of said zone of dextrinization.

2. The method in accordance with claim 1 which includes the step of causing a stream of air to pass through the starch in countercurrent flow to the direction of travel of the starch through the zone of dextrinization.

3. The method in accordance with claim 1 in which the time of travel for any one particle of starch through the zone of dextrinization is controlled for from about 20 to about 60 minutes.

4. The method in accordance with claim 1 which includes the additional step of neutralizing the dextrinized starch with alkali.

5. A method of continuously dextrinizing starch involving use of a horizontally positioned rotatable drum having a plurality of spaced heated surfaces therein which comprises the steps of introducing dry particulate starch premixed with a dextrinization catalyst into one end of said drum while simultaneously rotating said drum and said heated surfaces in cylindrical paths sweeping through and around the direction of travel of the starch through said drum, thereby bringing the starch into rolling and tumbling contact with said heated surfaces and raising its temperature to that of dextrinization, passing air through said drum in countercurrent flow to the direction of travel of the starch therein, and collecting the dextrinized starch discharged from the end of the drum opposite the one into which the starch is introduced.

6. The method in accordance with claim 5 in which said interior heated surfaces comprise a plurality of tubes positioned parallel to the longitudinal axis of said drum and concentrically around the interior wall thereof, with means for passing steam through said tubes.

7. The method in accordance with claim 5 in which the drum is rotated at about 6 r.p.m. and starch is introduced therein at the rate of about ½ to 1 pound per minute whereby the time of travel for any one particle of starch through said drum is approximately 20 to 60 minutes.

References Cited by the Examiner
UNITED STATES PATENTS

| | | | |
|---|---|---|---|
| 1,283,839 | 11/18 | McLaurin | 127—38 |
| 2,818,357 | 12/57 | Ziegler et al. | 127—38 |
| 2,845,368 | 7/58 | Fredrickson | 127—38 |
| 2,989,425 | 6/61 | Bierke et al. | 127—38 |

MORRIS O. WOLK, *Primary Examiner.*